United States Patent
Bao et al.

(10) Patent No.: US 9,294,248 B2
(45) Date of Patent: Mar. 22, 2016

(54) METHOD AND DEVICE FOR USE IN FRAME ACKNOWLEDGEMENT

(75) Inventors: Dongshan Bao, Beijing (CN); Yubao Zhou, Beijing (CN); Huijuan Yao, Beijing (CN); Xiaoyan Yu, Beijing (CN); Shenfa Liu, Beijing (CN); Xiaoqiang Xie, Beijing (CN); Desheng Yan, Beijing (CN); Zhizuo Yang, Beijing (CN)

(73) Assignee: Nufront Mobile Communications Technology Co., Ltd., Beijing (CN)

( * ) Notice: Subject to any disclaimer, the term of this patent is extended or adjusted under 35 U.S.C. 154(b) by 118 days.

(21) Appl. No.: 14/008,327

(22) PCT Filed: Mar. 23, 2012

(86) PCT No.: PCT/CN2012/072895
§ 371 (c)(1),
(2), (4) Date: Dec. 3, 2013

(87) PCT Pub. No.: WO2012/130094
PCT Pub. Date: Oct. 4, 2012

(65) Prior Publication Data
US 2014/0086222 A1 Mar. 27, 2014

(30) Foreign Application Priority Data

| Mar. 31, 2011 | (CN) | 2011 1 0081288 |
| May 19, 2011 | (CN) | 2011 1 0130194 |
| Jul. 6, 2011 | (CN) | 2011 1 0189230 |
| Feb. 8, 2012 | (CN) | 2012 1 0027919 |
| Mar. 2, 2012 | (CN) | 2012 1 0053116 |

(51) Int. Cl.
*H04L 5/00* (2006.01)
*H04L 1/16* (2006.01)
*H04L 1/18* (2006.01)

(52) U.S. Cl.
CPC ............ *H04L 5/0055* (2013.01); *H04L 1/1621* (2013.01); *H04L 1/1685* (2013.01); *H04L 1/1825* (2013.01); *H04L 1/1854* (2013.01)

(58) Field of Classification Search
None
See application file for complete search history.

(56) References Cited

U.S. PATENT DOCUMENTS

| 5,528,605 A | 6/1996 | Ywoskus et al. |
| 7,738,459 B2* | 6/2010 | Sittin et al. .................. 370/392 |
| 2004/0223506 A1 | 11/2004 | Sato |
| 2005/0111452 A1* | 5/2005 | Mamillapalli et al. ........ 370/390 |
| 2006/0195629 A1 | 8/2006 | Sharma et al. |

(Continued)

FOREIGN PATENT DOCUMENTS

| CN | 1886667 A | 12/2006 |
| CN | 101534142 A | 9/2009 |

(Continued)

OTHER PUBLICATIONS

Extended European Search Report issued in European Patent Application No. 12763164.6 on Oct. 24, 2014.

*Primary Examiner* — Kerri Rose
(74) *Attorney, Agent, or Firm* — Morgan, Lewis & Bockius LLP (57) ABSTRACT

Provided in the present invention are a method and device for use in frame acknowledgement. The method comprises: bearing an immediate acknowledgement instruction into a data frame, the immediate acknowledgement instruction is for use in instructing an immediate return frame acknowledgement response; and transmitting the data frame having the immediate acknowledgement instruction attached thereto.

15 Claims, 7 Drawing Sheets (56) References Cited

U.S. PATENT DOCUMENTS

2008/0130538 A1* 6/2008 Raissinia et al. .............. 370/310
2009/0086704 A1* 4/2009 Ho ................................ 370/346

FOREIGN PATENT DOCUMENTS

| CN | 101663590 A | 3/2010 |
| CN | 101809923 A | 8/2010 |

* cited by examiner

METHOD AND DEVICE FOR USE IN FRAME ACKNOWLEDGEMENT

CROSS-REFERENCE TO RELATED APPLICATION

1) This application claims the priority of a Chinese patent application No. 201110081288.6 filed on Mar. 31, 2011 and titled "COMMUNICATION METHOD", which is incorporated herein by reference in its entirety.

2) This application claims the priority of a Chinese patent application No. 201110130194.3 filed on May 19, 2011 and titled "COMMUNICATION SYSTEM", which is incorporated herein by reference in its entirety.

3) This application claims the priority of a Chinese patent application No. 201110189230.3 filed on Jul. 6, 2011 and titled "METHOD AND DEVICE FOR RETRANSMISSION", which is incorporated herein by reference in its entirety.

4) This application claims the priority of a Chinese patent application No. 201210027919.0 filed on Feb. 8, 2012 and titled "METHOD AND DEVICE FOR RETRANSMISSION", which is incorporated herein by reference in its entirety.

5) This application claims the priority of a Chinese patent application No. 201210053116.2 filed on Mar. 2, 2012 and titled "METHOD AND DEVICE FOR FRAME ACKNOWLEDGEMENT", which is incorporated herein by reference in its entirety.

FIELD OF THE INVENTION

This Invention belongs to the field of wireless communication, especially related to the method and device for use in the frame acknowledgement.

BACKGROUND OF THE INVENTION

Over the recent years, wireless network technology include the wireless LAN technique WiFi that is based on the 802.11 standard, the Bluetooth system that is based on the 802.15 standard, the Femto technique that is directed to indoor applications and derived from the mobile communication system, etc.

The 802.11-based WiFi technique is currently the most widely used wireless network transmission technology. It is principally applied to wireless local area network environment, application scenarios with room predominate, may also be applied to an outdoor environment. 802.11 system evolves into 802.11a and 802.11g based on OFDM technology form initial 802.11b CDMA-based transmission mechanism. Although, in the latest IEEE 802.11n-2009 standard, enabling 802.11n physical peak rate attainable 600 Mbps by introducing multi-antenna (MIMO) technology, but typically MAC (Media Access Control) layer throughput only reaches to the maximum of 300 Mbps. So for conventional WLAN systems, MAC layer design of a single-user access network based on CSMA/CA (Carrier Sense Multiple Access with Collision Avoidance) is bottleneck of network performance. Thus, although existing Wi-Fi techniques provide user with cheap access way to some degree, but is hard to accommodate current and future rapid development of high rate multimedia traffic demands.

Femto technique based on 3GPP standard is a kind of new technology for indoor coverage evolved from mobile communication system, Femto technique based on 3G system employs CDMA transmission scheme, LTE or WiMAX system-oriented Femto techniques employ OFDM transmission scheme. This multiple access mechanism by time, frequency, codeword allocated for different users mutually orthogonal access resource contention, it is substantially different from competition-based CSMA/CA access. However Femto techniques derive from mobile communication system oriented 3G/LTE/WiMAX system. Since 3G/LTE/WiMAX system primarily apply to wide area coverage mobile communication scenario, system characteristics for short-range wireless communication scenario is not optimized. Meanwhile, strict requirement of synchronization in complicated upper layer protocol design and PHY layer based 3G/LTE/WiMAX, Results in equipment cost cannot be cheap as 802.11, that is also main reason why Femto technique have not been widely used at present.

With increasingly rapid development of multimedia service application requirements, in order to meet demand for wireless communication, there is a need to present a more suitable implementation.

SUMMARY OF THE INVENTION

The technical problem which needs to solve of this Invention is to provide the method and device for frame acknowledgement, thus guarantee the successful transmission of data efficiently.

This Invention provides a type of frame acknowledgement method is characterized by, including:

Bear the instant acknowledgement indication in data frame; the mentioned instant acknowledgement indication is used for indicating instant returned frame acknowledgement;

Send the data frame which carries the mentioned instant acknowledgement indication out.

This Invention provides a type of frame acknowledgement device is characterized by, including:

Encapsulation module, it is used for bearing instant acknowledgement indication in data frame; the mentioned instant acknowledgement indication is used for indicating the instant returned frame acknowledgement;

Sending module, it is used for delivering the data frame of the carried mentioned instant acknowledgement indication out.

This Invention provides a type of frame acknowledgement method is characterized by, including:

Bear the delayed acknowledgement indication in data frame; the mentioned delayed acknowledgement indication is used for indicating to allow the delayed returned frame acknowledgement;

Send the data frame which carries the mentioned delayed acknowledgement indication out.

This Invention provides a type of frame acknowledgement device is characterized by, including:

Encapsulation module, it is used for bearing the delayed acknowledgement indication in data frame; the mentioned delayed acknowledgement indication is used for indicating to allow the delayed returned frame acknowledgement;

Sending module, it is used for delivering the data frame which carries the mentioned delayed acknowledgement indication out.

This Invention provides a type of frame acknowledgement method is characterized by, including:

Receiving frame;

Analyze the frame header to obtain the acknowledgement method;

When the acknowledgement method is instant acknowledgement, send frame acknowledgement in the next time period;

When the acknowledgement method is delayed acknowledgement, send frame acknowledgement when it has free resources.

This Invention provides a type of frame acknowledgement device is characterized by, including:

Receiving module, it is used for receiving frame;

Analyzing module, it is used for analyzing the frame header and obtain the acknowledgement method;

Processing module, it is used for carrying out frame acknowledgement according to the acknowledgment method. When the acknowledgment method is instant acknowledgment, it will send frame acknowledgment in the next time period; if the acknowledgment method is delayed acknowledgment, it will send frame acknowledgment when it has free resources.

This Invention provides the method and device for frame acknowledgement. It can provide a response mode for guaranteeing the successful transmission of data and save transmission resources efficiently.

DETAILED DESCRIPTION OF THE INVENTION

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part and certain feature of some embodiments may be included in or replaced by a part and certain feature of other embodiment. The scope of the embodiments of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended automatically to limit the application scope to any individual invention or inventive concept.

The First Embodiment

The embodiment of this Invention provides a method for frame acknowledgement. It is not only suitable for management frame but also appropriate for data frame. After sending frame from transmitting terminal, the receiving terminal will get back to confirm and response to inform whether the data of the transmitting terminal have been received successfully, then it can carry out an efficient monitoring for the success of data.

Figure 1:
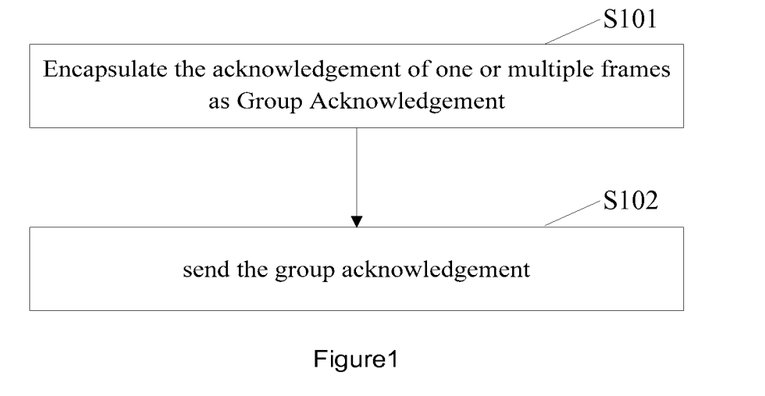
FIG. 1 is a schematic flow chart of a method for frame acknowledgement according to a first embodiment of the invention.

Refer to the FIG. 1, this figure shows one method for frame acknowledgement of embodiment of this Invention. It includes following steps:

Step S101: Encapsulate the acknowledgement of one or multiple frames as Group Acknowledgement (GroupAck);

Among them, the acknowledgement of the described frame is used for indicating the accepting state of frame. It includes accepted and unaccepted.

Step S102: send the group acknowledgement.

The embodiment of this Invention provides a response mode of group acknowledgement and it can send out by encapsulating the multiple frames acknowledgement to the same frame. By adopting this response mode, it just needs to send once for the same frame header parameter and it saves transmitting resources efficiently; in addition, when it transmits in the physical channel, it can get multiple frames response while implement one frame (GroupAck), thus to save physical transmitting resources efficiently.

The wireless communication system supports many businesses and the transmission of data in accordance with service flow. According to the types, the service flows can be divided into management service flow and data service flow. The management service flow is consisted of one or many management frames while the date service flow is made up of one or many date frames. Besides, the date services can also be divided into more flows according to the detailed business types, such as service flow 1 (FID1), service flow 2 (FID2) . . . service flow n (FIDn).

Therefore, step S101 includes (not shown in the figure):

Step S1011: Encapsulate the acknowledgement of one or multiple frames as Group Acknowledgement;

Step S1012: Encapsulate the acknowledgement of one or multiple service flows as Group Acknowledgement.

During encapsulating group acknowledgement, it also needs to encapsulate the described one or multiple identifiers of service flow and described one or multiple identifiers of frames on the basis of described service flows, so that receiving end can recognize which group acknowledgement received is the acknowledgement of the service flows and frames.

Preferably, the embodiment of this invention suggests bearing the acknowledgement of frames of service flow by each bits of bitmap and identifying the corresponding frame acknowledgement by the corresponding frame numbers of bits of the described bitmap. The receiving end will know which frame acknowledgement the described bit bear according to the corresponding frame number in bit of described bitmap and its content of acknowledgement.

Preferably, to the continuous and multiple frame acknowledgements of service flows, it can identify the continuous and multiple frame acknowledgements of service flow according to the specific position frame among the continuous frames, such as the corresponding frame number of the first bit among bitmaps and the length of bitmaps. One bitmap correspond one frame acknowledgement.

Preferably, the length of the described bitmap is not stable. The returned amount of frame acknowledgement is very flexible. It further improves the resource utilization rate.

Preferably, it also can set fragmentation indication message to indicate what the corresponding bitmap bears are fragmentation frame acknowledgement or not. It means the embodiment of this invention supports the frame acknowledgement to non fragmentation and fragmentation. At the same time, it can feedback the frame acknowledgement by blending fragmentation and non fragmentation. For example, it carries acknowledgement of FID1 and FID0 in the group acknowledgement and frame of FID0 is non fragmentation while FID1 is fragmentation. Then the bitmap0 will be indicated as the non fragmentation frame acknowledgement of FID0 and the bitmap1 will be indicated as the fragmentation frame acknowledgement of FID1. Another example, it carries acknowledgement of FID1 and FID0 in the group acknowledgement. The frame of FID0 contains non fragmentation and fragmentation frame and the frame of the FID1 is non fragmentation. Then bitmap0 will be indicated as the non fragmentation frame acknowledgement of FID0, the bitmap1 will be as indicated the fragmentation frame acknowledgement of FID0 and the bitmap2 will be as indicated the fragmentation frame acknowledgement of FID1.

Figure 2:
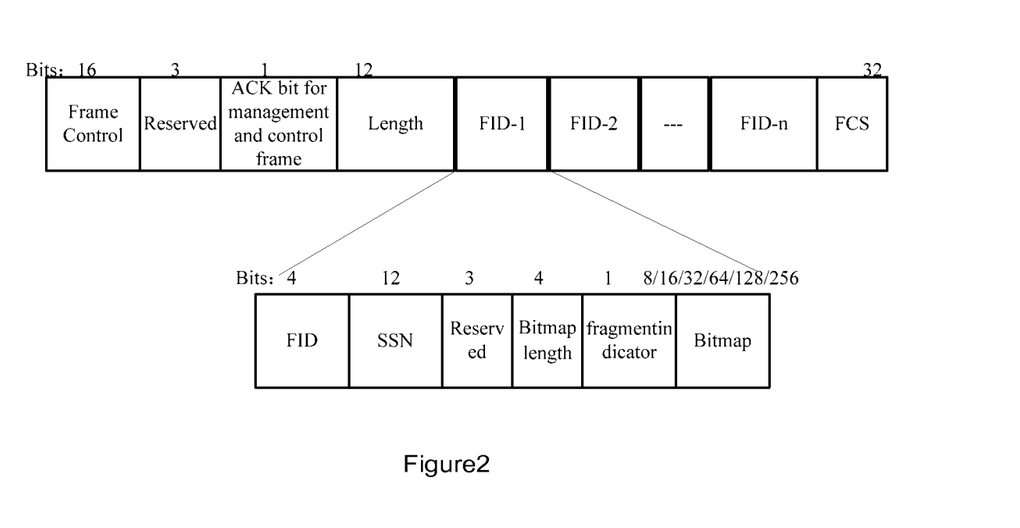
FIG. 2 is a detailed frame format for group acknowledgement frame according to a first embodiment of the invention.

In order to state it more clearly, the embodiment of this invention also provides a detailed form for group acknowledgement frame, as in FIG. 2. The group acknowledgement frame shown as the FIG. 2 contains frame header, frame body and frame check series message (FCS). The frame header includes frame control message such as frame types (management frame or data frame). Subtype (detailed management frame types or detailed data frame types), version information and so on; the frame body contains one or multiple FID message blocks. The described FID message blocks include service flow identification, serial number and bitmap. Among which, the described bitmap is used to bear the continuous and multiple frame acknowledgement. One bitmap correspond one frame acknowledgement. The described serial numbers is used to indicate the corresponding frame number of the first bit in the described bitmap.

Preferably, install the length of bitmap according to each FID message block; the described length of bitmap is not constant.

Preferably, it also needs to install the length field of bitmap in the described FID message block to indicate the length of bitmap.

Preferably, it needs to install the fragmentation indication message in the described FID message block to indicate what the described bitmap bear is the frame acknowledgement of fragmentation or non fragmentation.

Preferably, it also installs management control frame acknowledgement bit. It is used to acknowledge one received management control frame of no serial number.

Preferably, it can install the length field in frame. It is used to indicate the total bytes length of described length field and FCS field. It means the sum of length for all the FID message blocks.

Each parameter definition of frame body can refer to FIG. 1:

FIG. 1

| Field | Length (Bit) | Description |
| --- | --- | --- |
| Reservation | 3 | Default setting is 0. |
| Management Control Frame Acknowledgement | 1 | Indicate to acknowledge a received management control frame of no serial number. |
| Length | 12 | It means the total bits length between the described length field and FCS field. |
| FID | 4 | Inform the transmitter that this FID message block is a GroupAck to one FID service flow. |
| SSN | 12 | Inform the transmitter that the start numbers of Bitmap of FID message block. |
| Bitmap Length | 4 | Indicate the Bitmap length of each FID message block.<br>0: 8 bit;<br>1: 16 bit;<br>2: 32 bit;<br>3: 64 bit;<br>4: 128 bit;<br>5: 256 bit;<br>6-15: reservation. |
| Reservation | 3 | Default setting is 0. |
| Fragmentation or not | 1 | It's 1. Indicate the acknowledgement to the fragmentation data frame. At present, each bit of Bitmap is making an acknowledgement to one fragmentation of one frame.<br>It's 0. Indicate the acknowledgement to the non fragmentation data frame. Now each bit of Bitmap is making acknowledgement of one frame. |
| Bitmap | 8/16/32/ 64/128/ 256 | One bit of Bitmap means receiving successfully or not of some MPDU or fragmentation. If it is successful, it will be 1. If not, it will be 0. The serial number of MPDU or fragmentation number is calculated according to the SSN and offset. |

The described frame acknowledgement is used to indicate the accepting state of frame. It includes the accepted and unaccepted.

Following is some descriptions of trigger of returning frame acknowledgement for the embodiment of this invention:

1. Instant Acknowledgement:

Method1: after receiving the instant acknowledgement, return the acknowledgement frame immediately.

Among which, the described instant acknowledgement requests may be a request frame format which has been agreed on by both sides. Preferably, the described instant acknowledgement request can be the group acknowledgement request which one or multiple service flow identification and one or multiple frame identification of each service flow. It is used to indicate the specific frame acknowledgement of the instant returning specific service flow. After receiving the described group acknowledgement requests, return the specific frame acknowledgement of specific data flow immediately.

The described instant acknowledgement requests also may be an indicating bit which has been agreed on by both sides. For example, agree on some field of data frame is the indicating bit. When analyzing the data frame, if it analyzes the instant acknowledgement in data frame, return the acknowledgement frame immediately.

Preferably, install the described instant acknowledgement indication in the frame header of data frame.

The described instant returning acknowledgement frame of the embodiment of this invention will return in the next time period.

In the embodiment of this invention, center access point (CAP) and station (STA) can be delivering end and receiving end mutually. Among which, CAP is responsible for providing access service entity of the accessed STA; STA has functional interface of media access control (MAC) and physical layer (PHY), it is a terminal equipment which can communicate with CAP. The transceiving double-end carries out the communication by the physical frame. Each physical frame period includes down period and up period successively: CAP deliveries date to STA in the down period; STA sends data to CAP in the up period. In the embodiment of this invention, the indication opposite terminal returns the acknowledgement frame immediately; the indicated instant returning time is the next time period. It means the up physical frame period corresponding to the down physical frame period or the down physical frame period corresponding to the last up physical frame period. Specifically, when the delivering end is CAP and it deliveries the described instant acknowledgement indication data frame in the down physical period of the frame, the described instant acknowledgement indication is used to indicate the up physical period returning frame acknowledgement of STA in the frame; when the delivering end is STA and it deliveries the instant acknowledgement indication data frame in the up physical period of the frame, the described instant acknowledgement indication is used to indicate the down physical period returning frame acknowledgement of CAP in the next frame.

2. Delayed-ACK

Under the condition of not receiving the instant acknowledgement requests, it can be thought it allows to the delayed returning frame acknowledgement of opposite end.

In the embodiment of this invention, the agreed indicating bit of both sides shows the delayed acknowledgement. For example, one field of the agreed data frame is the delayed acknowledgement indication bit. The waiting interval of frame acknowledgement which used the delayed-ACK is decided by the delivering end. It can delivery when it has free resource. If it analyzes the delayed-ACK indication from data frame during analyzing data frame, it will return the acknowledgement frame when it has free resource.

The Second Embodiment

To the management control frame, the unicast management frame which has no corresponding response frame needs to acknowledge by using ACK or group acknowledgement (GroupAck). Otherwise, it will use corresponding response frame acknowledgement.

The embodiment of this invention also provides some management frame, request frame and the corresponding response frame, as shown in the FIG. 2. Of course, in another embodiment, it also can install other management request frame and its corresponding response according to the demands. This invention doesn't do any limitation here.

FIG. 2

| Request Frame | Corresponding Response Frame |
|---|---|
| Radom Access Request Frame (RA_REQ) | Radom Access Response Frame (RA_RSP) |
| Terminal Basic Capability Negotiation Request (SBC_REQ) | Terminal Basic Capability Negotiation Response(SBC_RSP) |
| Upstream Dynamic Service Access Request (DSA_REQ) | Dynamic Service Access Response(DSA_RSP) |
| Upstream Dynamic Service Change Request (DSC_REQ) | Dynamic Service Change Response(DSC_RSP) |
| Upstream Dynamic Service Delete Request (DSD_REQ) | Dynamic Service Delete Response(DSD_RSP) |
| Group Acknowledgement Request Frame (GroupAckReq) | Group Acknowledgement Frame(GroupAck) |
| Sleep Request Frame (SLP_REQ) | Sleep Response Frame(SLP_RSP) |

All the non-broadcast management control frames (except the random access request response frame and independent resource request frame) need to send acknowledgement frame or implied acknowledgement. The implied acknowledgement means that the unicast management control frame which has the corresponding response frame can regard the response frame as the acknowledgement frame of this frame. The non-broadcast management control frame doesn't need to acknowledge immediately, response frame just needs to response in the maximum physical frame. If the response frame which delivered by CAP doesn't receive the acknowledgement frame of STA, it can deliver this response frame again before it reaches the default maximum retransmission. When the retransmission times exceed the described default maximum times, the delivering end will give up this frame.

Whether the data frame uses instant acknowledgement and delayed acknowledge is decided by the delivering end. The receiving end can indicate whether it needs the instant acknowledgement or not according to the installed indication frame acknowledgement method of MAC header. The waiting interval of frame acknowledgement by using the instant acknowledgement is a time period while the waiting interval of frame acknowledgement by using the delayed acknowledgement is decided by the delivering end.

If the acknowledgement method is instant acknowledgement and it doesn't receive the acknowledgement frame in the next time period, this data frame can be delivering again before it reaches the default maximum retransmission times. If retransmission times exceed the described default maximum times, the delivering end will give up this frame. The next time period here said may be the up physical frame period corresponding to the down physical frame period or the down physical frame period corresponding to the last up physical frame period. That means when it delivers the described data frame of carried instant acknowledgement indication during the down physical period of this frame, the described instant acknowledgement indication is used to indicate the up physical period returned frame acknowledgement of this frame; when it delivers the described data frame of carried instant acknowledgement indication during the up physical period of this frame, the described instant acknowledgement indication is used to indicate the down physical period returned frame acknowledgement of this frame. When the MPDU retransmits, the number and fragmentation remain unchanged.

If the acknowledgement method is delayed acknowledgement and it doesn't receive the acknowledgement frame in the waiting interval which is installed in the delivering end, this data frame can be retransmitted before the default maximum retransmission times. When the retransmission times exceed the described default maximum times, the delivering end will give up this frame.

There is no need other frames to acknowledge ACK frame and GroupAck frame.

To the data frame of fragmentation and non fragmentation, it can acknowledge by using any method of ACK or GroupAck.

Figure 3:
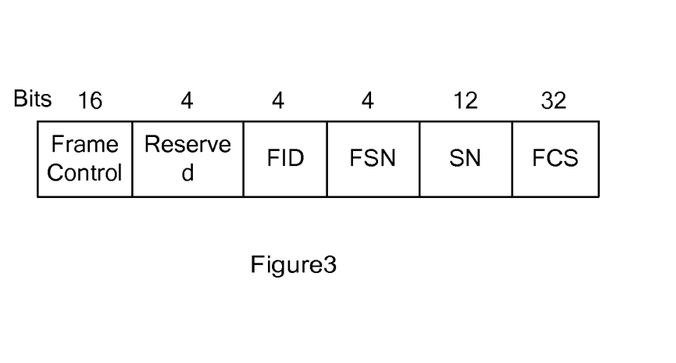
FIG. 3 is a detailed frame format for acknowledgement frame according to a second embodiment of the invention.

The embodiment of this invention also provides another frame acknowledgement method (ACK frame). It is suitable for aiming at the single frame acknowledgment. In order to state more intuitively, the embodiment of this invention also provides a detailed acknowledgement frame method, as shown in FIG. 3. The acknowledgement frame which is shown by FIG. 3 includes frame header, frame body and frame check series (FCS). The frame header contains frame control message such as frame types (management frame or data frame), subtypes (detailed management frame types or detailed data frame types), and version messages and so on; the frame body includes FID, fragmentation serial number (FSN), frame serial number (SN). Each parameter definition of frame body can refer to FIG. 3:

FIG. 3

| Field | Length (bit) | Description |
| --- | --- | --- |
| Reservation | 4 | Default setting is 0. |
| FID | 4 | Service flow identification. |
| FSN | 4 | It means this acknowledgement is a frame acknowledgement of fragmentation serial number FSN. If it doesn't adopt fragmentation, the setting of this field will be 0. |
| SN | 12 | It means this acknowledgement is a MPDU acknowledgement of SN. If the acknowledged is management control frame of none serial number, the SN will be set as 0. |

The Third Embodiment

Figure 4:
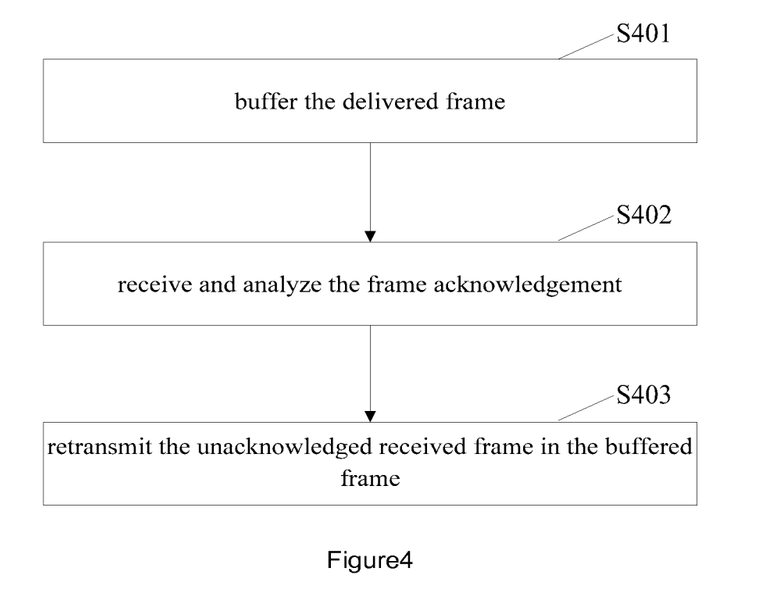
FIG. 4 is a schematic flow chart of a method for retransmission according to a third embodiment of the invention.

The embodiment of this invention provides a retransmission method, as shown in FIG. 4. It includes the following steps:

Step S401: buffer the delivered frame;

Step S402: receive and analyze the frame acknowledgement;

Step S403: retransmit the unacknowledged received frame in the buffered frame.

The retransmitted data of retransmission method provided by the embodiment of this invention is maintained by delivering end. During retransmitting, it only retransmits the unacknowledged received frame and it will not retransmit the received frame. Especially when it retransmits data according to the default window, it allows to not retransmitting the acknowledged and received frame again of the window. It saves transmission resource greatly.

Preferably, the acknowledged and received frame in the buffered frame can be deleted. So that it can save the local caching efficiently.

Figure 5:
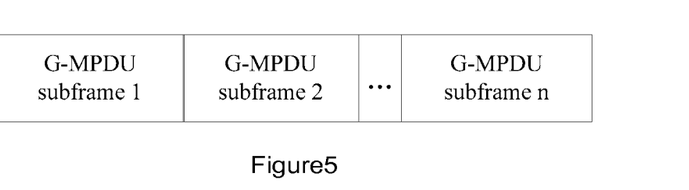
FIG. 5 is a detailed frame format for G-MPDU frame according to a third embodiment of the invention.
Figure 6:
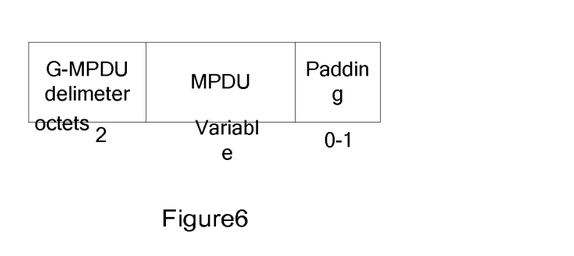
FIG. 6 is a detailed frame format for G-MPDU subframes according to a third embodiment of the invention.

Preferably, it can encapsulate one or multiple continuous frames as group frame (G-MPDU) to deliver. As shown in FIG. 5, the G-MPDU is consisted of a series of G-MPDU subframes. As shown in FIG. 6, G-MPDU subframes contain G-MPDU delimiter, MPDU and probable stuffing bytes. Except for the last G-MPDU subframe, each G-MPDU subframe needs to add 0-1 stuffing byte and make the length of each F-MPDU is the integral multiple of two bytes. The indicated G-MPDU delimiter is used to localize the MPDU of G-MPDU. Encapsulate many frames together and deliver them, when it transmits in physical channel it can obtain many frames during the synchronization of one frame (G-MPDU), then it can save the physical transmission resources efficiently.

The received frame acknowledgement in step S402 may be the group acknowledgement provided in the embodiment one or the single frame acknowledgement of embodiment two.

The Fourth Embodiment

Figure 7:
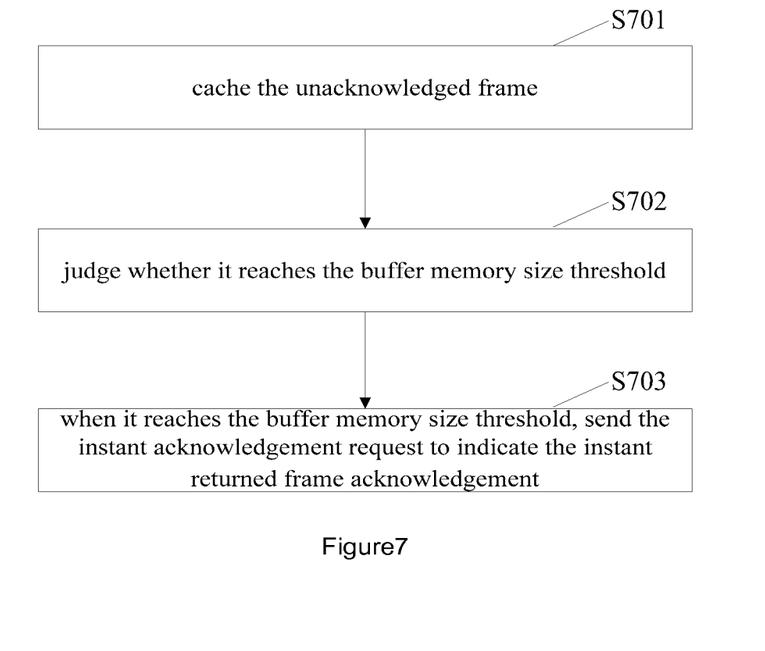
FIG. 7 is a schematic flow chart of a method for retransmission according to a fourth embodiment of the invention.

To the considering of caching capability and prevent the error of exceeding caching capability, the embodiment of this invention also provides a method of retransmission and increasing the monitoring of caching capability of this terminal. If it detects that the caching capability may have any overrunning risks, it will inform the opposite terminal to return acknowledgement immediately. The detailed is as shown in FIG. 7 and it includes following steps:

Step S701: cache the unacknowledged frame;

Step S701: judge whether it reaches the buffer memory size threshold;

Step S701: when it reaches the buffer memory size threshold, send the instant acknowledgement request to indicate the instant returned frame acknowledgement.

Preferably, the described instant acknowledgement request carries one or multiple service flow identification and one or multiple frame identification of each service flow to indicate the appointed frame acknowledgement of the instant returned data flow.

Preferably, the described instant acknowledgement request can carry the serial number of the first frame which needs to return the acknowledgement of each service flow. It is used to indicate the frame acknowledgement which starts from the described first frame in the opposite described service flow.

Figure 8:
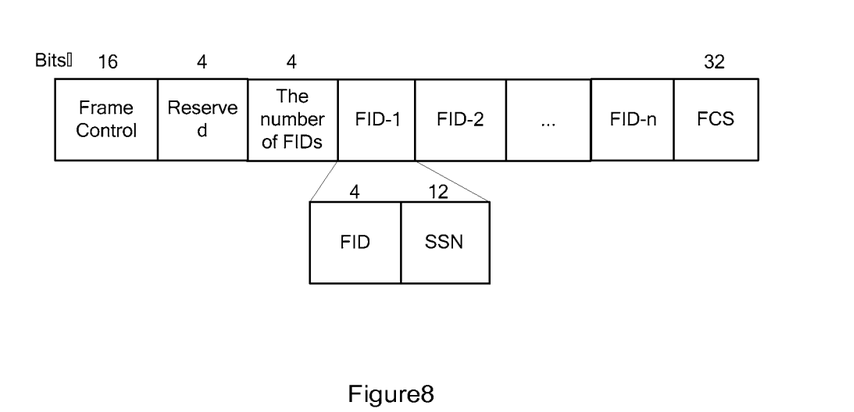
FIG. 8 is a detailed frame format for instant acknowledgement request frame according to a fourth embodiment of the invention.

In order to explain it more intuitively, the embodiment of this invention also provides a detailed instant acknowledgement request frame format, as shown in FIG. 8. The instant acknowledgement request which is shown in FIG. 8 includes frame header, frame body and frame check series (FCS). The frame header contains frame control message such as frame types (management frame or data frame), subtypes (detailed management frame types or detailed data frame types), and version messages and so on; frame body contains one or multiple FID message blocks. Each FID message block includes service flow identification FID and serial number. The described serial number means the first frame serial number which needs to return the acknowledgement in service and it is used to indicate the opposite end starts to return acknowledgement from the first described frame. It corresponds to the corresponding frame serial number of the first bit in bitmap of group acknowledgement which is provided by the embodiment one. Each parameter definition of frame body can refer to FIG. 4:

FIG. 4

| Field | Length (Bit) | Description |
| --- | --- | --- |
| reservation | 4 | The default setting is 0. |
| FID Number | 4 | Indicate the contained FID message block numbers between this field and FCS. |
| FID | 4 | Request the receiving end carry out GroupAck to this FID service flow. |
| SSN | 12 | Inform the receiving end use this value as the start serial number of Bitmap during GroupAck. |

Preferable, the embodiment of this invention also provides another method to realize the instant acknowledgement: by bearing the instant acknowledgement indication in data frames and sent it with data frame together, so that it can send instant acknowledgement request; the described instant acknowledgement indication is used to indicate the instant returned frame acknowledgement.

Preferable, it can bear instant acknowledgement indication in the frame header of data frame.

Among which, the mentioned instant returned frame acknowledgement will return the described group acknowledgment in the next time period. The mentioned next time period means the up physical frame period corresponding to the down physical frame period or down physical frame period corresponding to the last up physical frame period. That means when it sends the mentioned carried instant acknowledgement indication data frame in the down physical period of this frame, the described instant acknowledgement indication is used to indicate the up physical period returned frame acknowledgement of the opposite end in this frame; when it sends the mentioned carried instant acknowledgement indication data frame in the up physical period of this frame, the described instant acknowledgement indication is used to indicate the down physical period returned frame acknowledgement of the opposite end in this frame;

Preferably, the embodiment of this invention also can bear the delayed acknowledgement indication in data frame and send with the data frame before reaching the buffer memory size threshold. The mentioned delayed acknowledgement indication is used to indicate that it allows returning all the unacknowledged data frame acknowledgements lingeringly of each service flow. When the opposite end is analyzing data frame, if it analyzes the delayed acknowledgement indication from data frame, it will return all the unacknowledged frame acknowledgement of each service flow when it has free resources.

The embodiment of this invention also provides a choice of frame acknowledgement delivering opportunity. Center access point (CAP) and station (STA) can be delivering end and receiving end reciprocally. The details are included:

1. If CAP sends management control frame (needs to acknowledge) to STA, the CAP needs to reserve resource for acknowledgement frame when it dispatches the upstream transmission resources and guarantees STA has chances to send acknowledgement frame successfully.

2. If CAP delivers G-MPDU to STA and indicates STA to carry out the instant acknowledgement by using filed of indication frame acknowledgement method, the CAP needs to reserve resources for GroupAck frame or ACK frame when it dispatches the upstream transmission resources.

3. If CAP sends aggregated data frame to STA and indicates to allow the STA delayed response by using field of indication frame acknowledgement method, the STA can pass GroupAck frame back when there is some surplus of upstream transmission resource. It also can pass GroupAck back until it receives the information of instant acknowledgement which is sent by CAP.

4. If STA sends management control frame (needs to acknowledge) to CAP, the CAP will carry out the acknowledgement in the down physical period of next frame.

5. If STA sends G-MPDU to CAP and indicates CAP to carry out the instant acknowledgement by using filed of indication frame acknowledgement method, the CAP will deliver GroupAck frame or ACK frame in the down physical period of next frame.

6. If STA sends aggregated data frame to CAP and indicates to allow the CAP delayed response by using field of indication frame acknowledgement method, the CAP can pass GroupAck frame back when there is some surplus of down transmission resource. It also can pass GroupAck back until it receives the information of instant acknowledgement which is sent by STA.

The Fifth Embodiment

Figure 9:
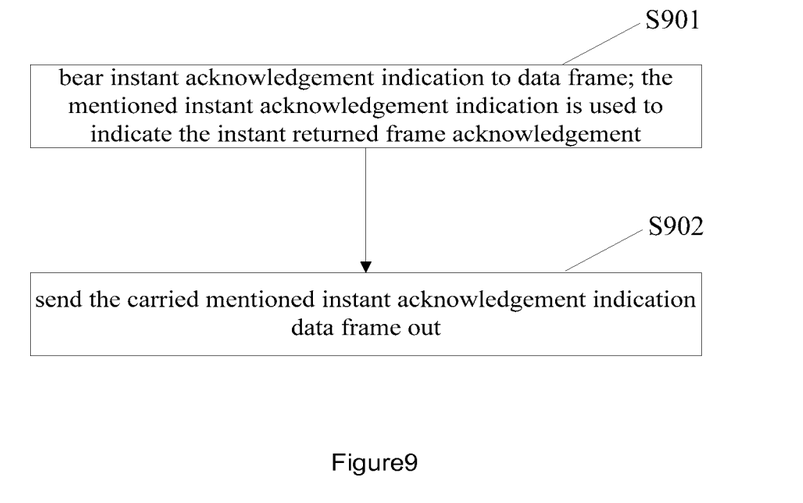
FIG. 9 is a schematic flow chart of a method for adopting associated mode to bear the instant acknowledgement request according to a fifth embodiment of the invention.

The embodiment of this invention provides a frame acknowledgement method. It adopts associated mode to bear the instant acknowledgement request and requires carrying out frame acknowledgement of opposite end, as shown in FIG. 9. The steps include:

Step S901: bear instant acknowledgement indication to data frame; the mentioned instant acknowledgement indication is used to indicate the instant returned frame acknowledgement;

Step S902: send the carried mentioned instant acknowledgement indication data frame out.

Preferably, both sides of receiving and dispatching can appoint one field of data frame as the instant acknowledgement indicating bit. When delivering data frame, it requests the opposite end return the frame acknowledgement immediately by setting instant acknowledgement indicating bit. Preferably, it can set instant acknowledgement indicating bit in the data frame header. When delivering the acknowledgement request, it can indicate the opposite end return the frame acknowledgement immediately by setting data frame header.

Preferably, the mentioned instant returned frame acknowledgement means to return the mentioned group acknowledgement in the next time period. The mentioned next time period indicates the up physical frame period corresponding to the down physical frame period or the down physical frame period corresponding to the last up physical frame period. That means when it sends the mentioned carried instant acknowledgement indication data frame in the down physical period of this frame, the described instant acknowledgement indication is used to indicate the up physical period returned frame acknowledgement of the opposite end in this frame; when it sends the mentioned carried instant acknowledgement indication data frame in the up physical period of this frame, the described instant acknowledgement indication is used to indicate the down physical period returned frame acknowledgement of the opposite end in this frame;

Preferably, the mentioned instant acknowledgement indication is used for indicating to return all the unacknowledged frame acknowledgements. So that the transmission efficiency can be improved and reduce the unnecessary waste of bandwidth.

To the send time of instant acknowledgement requests, this invention designs to monitor the caching capacity. When it exceeds the capacity threshold, it will inform the opposite to feedback the frame acknowledgement immediately and to prevent the fault of exceeding caching threshold. The detailed steps are as following:

Step 1: cache the unacknowledged frame;

Step 2: judge whether it reaches the caching capacity threshold;

Step 3: before reaching the caching capacity threshold, trigger the delivering of instant acknowledgement indication.

Figure 10:
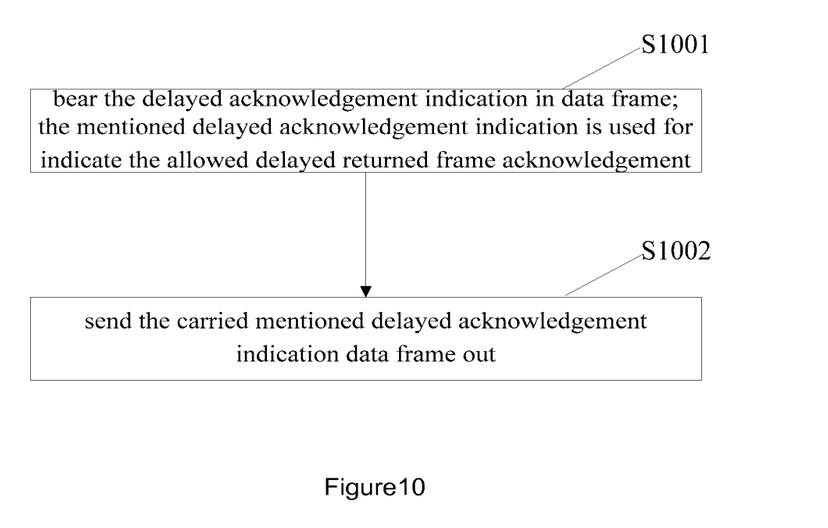
FIG. 10 is a schematic flow chart of a method for adopting associated mode to bear the delayed acknowledgement request according to a fifth embodiment of the invention.

The embodiment of this invention also provides a frame acknowledgement method. It adopts associated mode to bear acknowledgement request and informs the opposite to return the frame acknowledgement. But is allows the delayed return of opposite end, as shown in FIG. 10. It includes the following steps:

Step S1001: bear the delayed acknowledgement indication in data frame; the mentioned delayed acknowledgement indication is used for indicate the allowed delayed returned frame acknowledgement;

Step S1002: send the carried mentioned delayed acknowledgement indication data frame out.

Preferably, both sides of receiving and dispatching can appoint one field of data frame as the delayed acknowledgement indicating bit. When delivering data frame, it informs the opposite end return the frame acknowledgement by setting delayed acknowledgement indicating bit. Preferably, it can set delayed acknowledgement indicating bit in the data frame header. When delivering the acknowledgement request, it can indicate the opposite end return the frame acknowledgement by setting data frame header.

Preferably, the mentioned delayed acknowledgement indication is used for indicating to return all the unacknowledged frame acknowledgements. So that the transmission efficiency can be improved and reduce the unnecessary waste of bandwidth.

To the send time of delayed acknowledgement requests, this invention designs to monitor the caching capacity. When it doesn't exceed the capacity threshold, it means it will not exceed the capacity and make mistakes. It is not very hurry to return the frame acknowledgement. Then it needs to sure the smooth execution of the task for opposite end. Therefore, send the delayed acknowledgement indication and allow the opposite end returning frame acknowledgement lingeringly. The detailed steps are as following:

Step 1: cache the unacknowledged frame;

Step 2: judge whether it reaches the caching capacity threshold;

Step 3: before reaching the caching capacity threshold, trigger the delivering of delayed acknowledgement indication.

The above two frame acknowledgement methods of this invention consider the priority of local processing and opposite end service assurance. It balances the priority of both sides and improves the whole performance of system; and it also adopts associated mode to carry out the indication. It makes fully use of the present transmission resources and reduces the occupied transmission resources which are informed by the opposite end. At the same time, it is very easy to realize and it has a high economic value.

Figure 11:
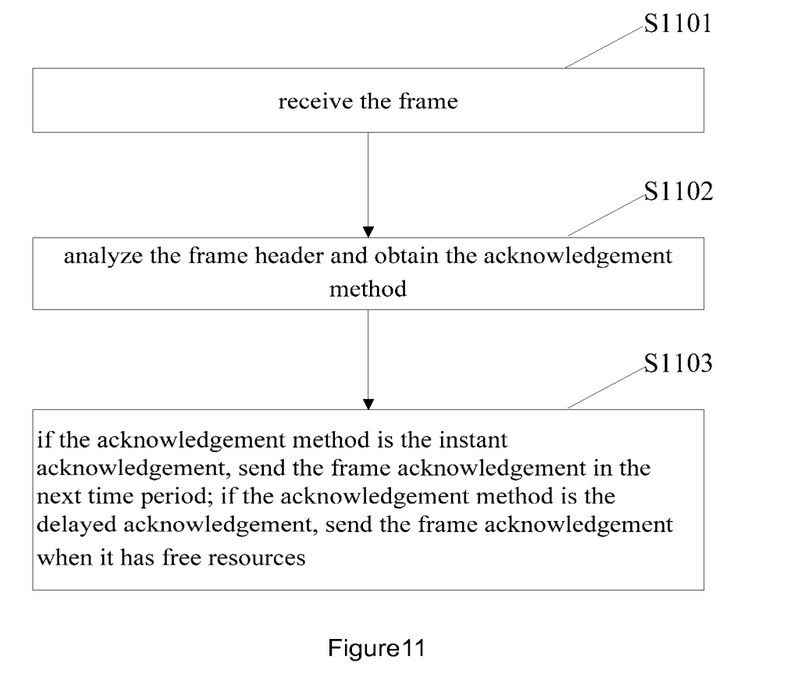
FIG. 11 is a schematic flow chart of a method for receiving the delayed acknowledgement request adopted by associated mode according to a fifth embodiment of the invention.

Accordingly, the embodiment of this invention also provides a frame acknowledgement method. It adopts the frame acknowledgement request which sent by the mentioned associated mode in handling, as shown in FIG. 11. The steps include:

Step S1101: receive the frame;

Step S1102: analyze the frame header and obtain the acknowledgement method;

Step S1103: if the acknowledgement method is the instant acknowledgement, send the frame acknowledgement in the next time period; if the acknowledgement method is the delayed acknowledgement, send the frame acknowledgement when it has free resources.

Among which, when receive frame in the down physical period of this frame and analyze its acknowledgement is instant acknowledgement, send the frame acknowledgement in the up physical period of this frame; when receive frame in the up physical period of this frame and analyze its acknowledgement is instant acknowledgement, send the frame acknowledgement in the down physical period of next frame.

Preferably, when one or multiple users receive the instant acknowledgement indication in the current time period, the users who received the indication need to send frame acknowledgement in the next time period.

Figure 12:
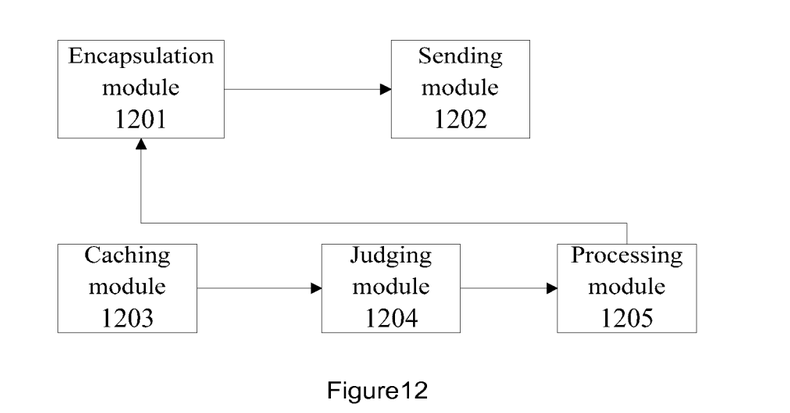
FIG. 12 is a first structural representation of a device for frame acknowledgement according to a fifth embodiment of the invention.

In order to realize the above frame acknowledgement method which asks the opposite end to carry out the frame acknowledgement, the embodiment of this invention also provides a frame acknowledgement device, as shown in FIG. 12. It includes:

Encapsulation module 1201, it is used for bearing instant acknowledgement indication in data frame; the mentioned instant acknowledgement indication is used for indicating the instant returned frame acknowledgement;

Sending module 1202, it is used for delivering the data frame of the carried mentioned instant acknowledgement indication out.

Preferably, the mentioned encapsulation 1201 is used for bearing the mentioned instant acknowledgement indication in the frame header of data frame.

Preferably, the mentioned instant returned frame acknowledgement means to deliver the mentioned group acknowledgement in the next time period. The mentioned next time period means the up physical frame period corresponding to the down physical frame period or the down physical frame period corresponding to the last up physical frame period.

That means when the mentioned sending module 1202 sends the mentioned data frame which carried instant acknowledgement indication in the down physical period of this frame, the described instant acknowledgement indication is used for indicating the returned frame acknowledgement of the up physical period of this frame. When the mentioned sending module 1202 sends the mentioned data frame which carried instant acknowledgement indication in the up physical period of this frame, the described instant acknowledgement indication is used for indicating the returned frame acknowledgement of the down physical period of next frame.

Preferably, the mentioned instant acknowledgement indication is used for indicating all the returned and unacknowledged frame acknowledgements.

Preferably, it also includes:

Caching module 1203, it is used for caching the unacknowledged frame;

Judging module 1204, it is used for judging whether it has reached caching capacity threshold;

Processing module 1205, it is used for triggering the delivering of instant acknowledgement indication when it reaches caching capacity threshold.

Figure 13:
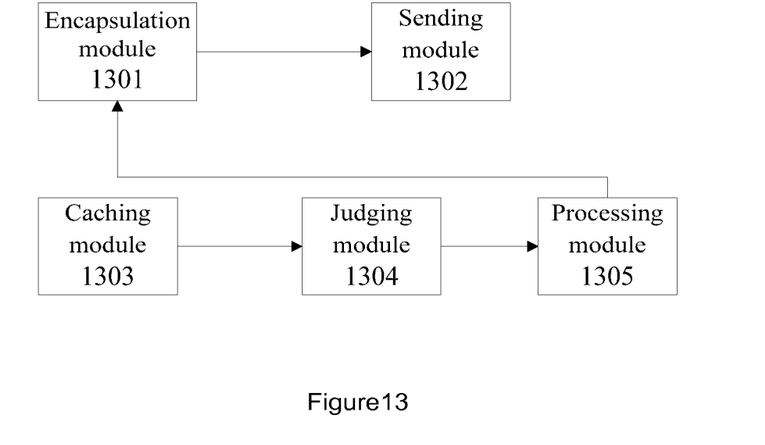
FIG. 13 is a second structural representation of a device for frame acknowledgement according to a fifth embodiment of the invention.

In order to realize the above frame acknowledgement method that informs the opposite end to allow the delay frame acknowledgement, the embodiment of this invention also provides another frame acknowledgement device, as shown in FIG. 13. It includes:

Encapsulation module 1301, it is used for bearing delayed acknowledgement indication in data frame; the mentioned delayed acknowledgement indication is used for indicating the delayed returned frame acknowledgement;

Sending module 1302, it is used for delivering the data frame of the carried mentioned delayed acknowledgement indication out.

Preferably, the mentioned encapsulation 1301 is used for bearing the mentioned delayed acknowledgement indication in the frame header of data frame.

Preferably, the mentioned delayed acknowledgement indication is used for indicating all the returned and unacknowledged frame acknowledgements.

Preferably, it also includes:

Caching module 1303, it is used for caching the unacknowledged frame;

Judging module 1304, it is used for judging whether it has reached caching capacity threshold;

Processing module 1305, it is used for triggering the delivering of delayed acknowledgement indication when it reaches caching capacity threshold.

Figure 14:
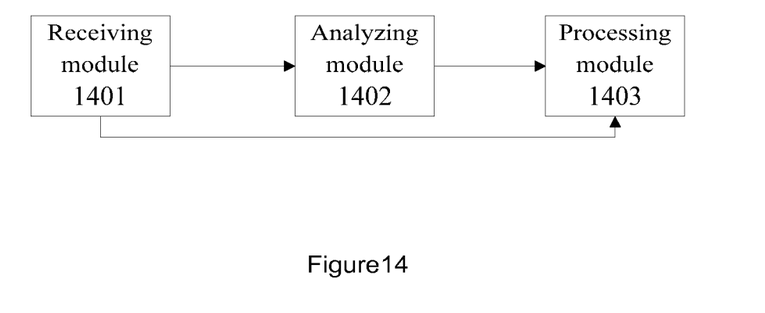
FIG. 14 is a third structural representation of a device for frame acknowledgement according to a fifth embodiment of the invention.

In order to realize the above frame acknowledgement method of instant acknowledgement request which is sent by mentioned associated mode, the embodiment of this invention also provides another device which is used for frame acknowledgement, as shown in FIG. 14. It includes:

Receiving module 1401, it is used for receiving frame;

Analyzing module 1402, it is used for analyzing the frame header and obtain the acknowledgement method;

Processing module 1403, it is used for carrying out frame acknowledgement according to the acknowledgment method. When the acknowledgment method is instant acknowledgment, it will send frame acknowledgment in the next time period; if the acknowledgment method is delayed acknowledgment, it will send frame acknowledgment when it has free resources.

Preferably, when the acknowledgement method is instant acknowledgement and the mentioned receiving module 1401 receives the mentioned frame in the down physical period of this frame, the mentioned processing module 1403 will send the frame acknowledgement in the up physical period of this frame; if the acknowledgement method is instant acknowledgement and the mentioned receiving module 1401 receives the mentioned frame in the up physical period of this frame, the mentioned processing module 1403 will send the frame acknowledgement in the down physical period of next frame.

Preferably, to one or multiple users who receive the frame acknowledgement is instant acknowledgement in the present time period, the mentioned processing module 1403 will send the frame acknowledgement to the mentioned users in the next time period.

The Sixth Embodiment

Figure 15:
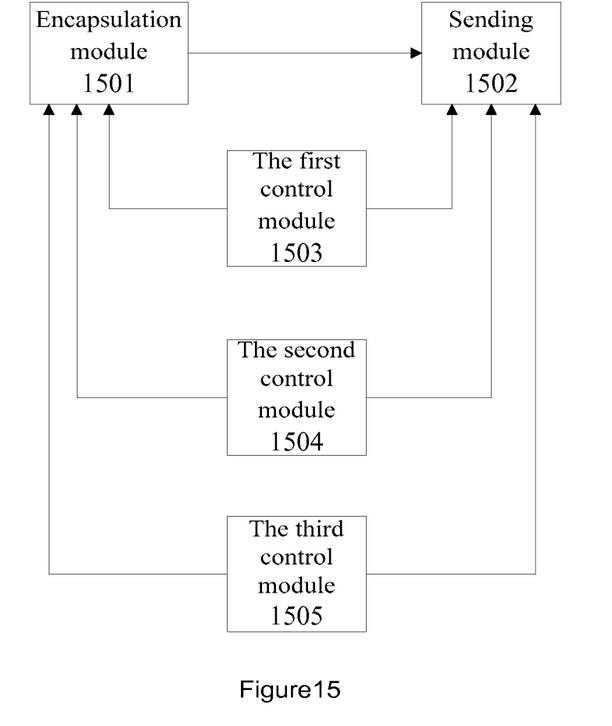
FIG. 15 is a first structural representation of a device for frame acknowledgement according to a sixth embodiment of the invention.

In order to realize the frame acknowledgement method in the embodiment of this invention, this invention also provides a frame acknowledgement device, as shown in FIG. 15. It includes:

Encapsulation module 1501, it is used for encapsulating one or multiple frame acknowledgements to group acknowledgement;

Sending module 1502, it is used for sending the mentioned group acknowledgement.

Preferably, the mentioned encapsulation module 1501 is used for encapsulating one or multiple frames acknowledgement in the same service flow to the service flow acknowledgement; encapsulating one or multiple service flow acknowledgements to group acknowledgement.

Preferably, the mentioned encapsulation module 1501 is used for encapsulating the frame header, frame body and FCS of group acknowledgement: set one or multiple FID message blocks in frame body. The mentioned service flow acknowledgement includes service flow identification, serial number and bitmap. Among which, the mentioned bitmap is used for bearing continuous multiple frames acknowledgement. Each bit of bitmap corresponding to one frame acknowledgement. The mentioned serial number is used for indicating the corresponding frame number of the first bit of the mentioned bitmap.

Preferably, the mentioned encapsulation module 1501 is used for setting each FID message block according to the length of bitmap; length of the described bitmap is not fixed.

Preferably, the mentioned encapsulation module 1501 also sets the length field of bitmap in the mentioned FID message block. It is used for indicating the length of bitmap.

Preferably, the mentioned encapsulation module 1501 also sets fragmentation indicating message in the mentioned FID message block. It is used for indicating the frame acknowledgement which bore by the mentioned bitmap is fragmentation or non fragmentation.

Preferably, the mentioned encapsulation module 1501 still sets management control frame acknowledgement bit in group acknowledgement. It is used for acknowledging the received management control frame of non serial number.

Preferably, the mentioned encapsulation module 1501 also sets length field in frame body. It is used for indicating the sum of length of all the FID message blocks.

Preferably, the mentioned frame acknowledgement is used for indicating the receiving state of frame. It includes the received and unreceived.

Preferably, it also includes:

The first control module 1503 is used for receiving the instant acknowledgement request, controlling the mentioned encapsulating module 1501 to encapsulate the group acknowledgement and controlling the mentioned sending module 1502 to send the encapsulated group acknowledgement.

Preferably, the mentioned instant acknowledgement requests to carry one or multiple service flow identifications and one or multiple frame identifications in each service flow; the mentioned first control module 1503 control the mention encapsulation module 1501 to encapsulate the appointed frame acknowledgement in the appointed data flow to group acknowledgement according to the instant acknowledgement request.

Preferably, the mentioned instant send means to return the mentioned group acknowledgement in the next time period. The described next time period means the up physical frame period corresponding to the down physical frame period or the down physical frame period corresponding to the last up physical frame period. That means the mentioned first control module 1503 controls the mentioned sending module 1502 to send the encapsulated group acknowledgement in the up physical period of this frame when the down physical period receives the mentioned instant acknowledgement request in this frame; the mentioned first control module 1503 controls the mentioned sending module 1502 to send the encapsulated group acknowledgement in the down physical period of next frame when the up physical period receives the mentioned instant acknowledgement request in this frame.

Preferably, it also includes:

The second control module 1504 is used for receiving the data frame which carries instant acknowledgement indication, controlling the mentioned encapsulating module 1501 to encapsulate the group acknowledgement and controlling the mentioned sending module 1502 to send the encapsulated group acknowledgement immediately.

Preferably, the mentioned second module 1504 is used for controlling the mentioned encapsulation module 1501 to encapsulate all the unacknowledged frame acknowledgement of each service flow as the group acknowledgement and controlling the mentioned sending module 1502 to send the encapsulated group acknowledgement immediately.

Preferably, the mentioned second control module 1504 obtains the mentioned instant acknowledgement indication by analyzing the frame header of data frame.

Preferably, the mentioned instant send means to return the mentioned group acknowledgement in the next time period. The described next time period means the up physical frame period corresponding to the down physical frame period or the down physical frame period corresponding to the last up physical frame period. That means the mentioned second control module 1504 controls the mentioned sending module 1502 to send the encapsulated group acknowledgement in the up physical period of this frame when the down physical period receives the mentioned instant acknowledgement request in this frame; the mentioned first control module 1503 controls the mentioned sending module 1502 to send the encapsulated group acknowledgement in the down physical period of next frame when the up physical period receives the mentioned instant acknowledgement request in this frame.

Preferably, it also includes:

The third control module 1505 is used for receiving the data frame which carries delayed acknowledgement indication, controlling the mentioned encapsulating module 1501 to encapsulate the group acknowledgement when it has free resources according to the delayed acknowledgement indication and controlling the mentioned sending module 1502 to send the encapsulated group acknowledgement.

The Seventh Embodiment

Figure 16:
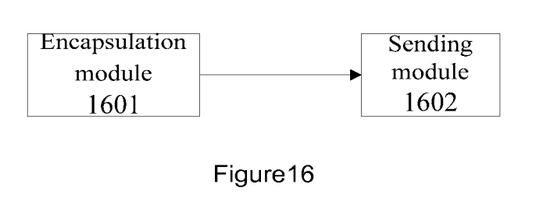
FIG. 16 is a first structural representation of a device for frame acknowledgement according to a seventh embodiment of the invention.

In order to realize the frame acknowledgement method in the embodiment of this invention, this invention also provides another frame acknowledgement device, as shown in FIG. 16. It includes:

Encapsulation module 1601, it is used for creating group acknowledgement request. The mentioned group acknowledgement request carries one or multiple service flow identifications and the frame identification which is needed to acknowledge in each service flow;

Sending module 1602, it is used for sending the mentioned group acknowledgement.

Preferably, the encapsulation module 1601 is used for encapsulating group acknowledgement, so that it can create the mentioned group acknowledgement request;

The mentioned group acknowledgement request includes frame header, frame body and FCS. The mentioned frame body includes one or multiple FID message blocks. Each FID message block contains service flow identification FID and serial number. It treats the responded first frame serial number in the mentioned service flow as the acknowledged frame identification and indicates to return the frame acknowledgement from the mentioned first frame.

Preferably, the mentioned encapsulation module 1601 also sets FID field in group acknowledgement request. It is used for indicate the included FID message blocks numbers of frame body.

Preferably, the mentioned group acknowledgement request is used for indicating to return the appointed frame acknowledgement of the appointed data flow immediately.

Preferably, the mentioned instant returned group acknowledgement request will return the mentioned group acknowledgement request in the next time period;

The mentioned next time period means the up physical frame period corresponding to the down physical frame period or the down physical frame period corresponding to the last up physical frame period. That means when the mentioned sending module 1602 sends the group acknowledgement in the down physical period of this frame, the described instant acknowledgement indication is used for indicating the returned frame acknowledgement of the up physical period of this frame. When the mentioned sending module 1602 sends the group acknowledgment in the up physical period of this frame, the described instant acknowledgement indication is used for indicating the returned frame acknowledgement of the down physical period of next frame.

The above description includes the examples of one or more embodiments. However, it is impossible to exhaust all potential combinations of the components and methods in describing the above embodiments, but it should be understood by one skilled in the art that components and methods of each embodiment may be further combined and arranged. Therefore, the embodiments described herein intend to contemplate all such changes, modifications and variations that fall into the scope of the appended claims. In addition, the term "comprise" used in the specification or the claims is similar to the term "include", just like the interpretation of the term "include" in the claims as a connection word. Additionally, any term "or" used in the claims or the specification intends to represent a "nonexclusive or".

The invention claimed is:

1. A frame acknowledgement method comprising:
   encapsulating an instant acknowledgement indication in data frame, wherein the instant acknowledgement is used to indicate returned frame acknowledgement in a next time period, the next time period being an up physical frame period corresponding to a down physical frame period, or a down physical frame period corresponding to a last up physical frame period; and
   sending the data frame that carries the instant acknowledgement indication out.

2. The method of claim 1, wherein, the instant acknowledgement indication is encapsulated in the frame header of data frame.

3. The method of claim 1, further comprising:
   when the instant acknowledgement is in an up physical period returned frame, sending the data frame in a down physical period of the frame; and
   when the instant acknowledgement is in a down physical period returned frame acknowledgement of next frame, sending the data frame in an up physical period of the frame.

4. The method of claim 1, further comprising:
   caching an unacknowledged frame;
   judging whether a caching capacity threshold is reached; and
   when the caching capacity threshold is reached, triggering a delivering of instant acknowledgement indication.

5. A frame acknowledgement device comprising:
   encapsulation module that encapsulates instant acknowledgement indication in a data frame, when the instant acknowledgement indication indicates the instant returned frame acknowledgement in a next time period, the next time period being an up physical frame period corresponding to a down physical frame period, or a down physical frame period corresponding to a last up physical frame period; and
   sending module that delivers the data frame of the instant acknowledgement indication.

6. The device of claim 5, wherein, the encapsulation module encapsulates the instant acknowledgement indication in the frame header of the data frame.

7. The device of claim 5, wherein,
   the sending module indicates an up physical period returned frame acknowledgement of this frame, in a down physical period of this frame; or
   the sending module indicates the down physical period returned frame acknowledgement of a next frame, in the up physical period of this frame.

8. The device of claim 5, further comprising:
   caching module that caches the unacknowledged frame;
   judging module that judges whether a caching capacity threshold is reached; and processing module that triggers the delivering of instant acknowledgement indication when the caching capacity threshold is reached.

9. A frame acknowledgement method comprising:
receiving a frame; and
analyze a frame header of the frame to obtain the acknowledgement method;
when the acknowledgement method is instant acknowledgement, sending frame acknowledgement in a next time period, the next time period being an up physical frame period corresponding to a down physical frame period, or a down physical frame period corresponding to a last up physical frame period; and
when the acknowledgement method is delayed acknowledgement, sending frame acknowledgement when it has free resources.

10. The method of claim 9, wherein,
when the frame is received in the down physical period of the frame, analyzing the acknowledgement method and when the acknowledgement method is instant acknowledgement, sending frame acknowledgement in an up physical period of this frame; and
when the frame is received in the up physical period of the frame, analyzing the acknowledgement method, and if the acknowledgement method is instant acknowledgement, sending frame acknowledgement in the down physical period of the next frame.

11. The method of claim 9, wherein, in the present time period, when one or many users receive the instant acknowledgement indication, a user who receives the indication will send frame acknowledgement in the next time period.

12. A frame acknowledgement device comprising:
receiving module that receives frame;
analyzing module that analyzes a frame header in the frame and obtains an acknowledgement method; and
processing module that carries out frame acknowledgement according to the acknowledgment method, wherein when the acknowledgement method is instant acknowledgement, sending frame acknowledgement in a next time period, and when the acknowledgement method is delayed acknowledgement, sending frame acknowledgement when it has free resources,
wherein the next time period is an up physical frame period corresponding to a down physical frame period, or a down physical frame period corresponding to a last up physical frame period.

13. The device of claim 12, wherein, the processing module receives the frame in the down physical period of the frame and analyzes the acknowledgement method to be instant acknowledgement, sending frame acknowledgement in the up physical period of the frame.

14. The device of claim 12, wherein when the processing module receives the frame in the up physical period of the frame and analyzes the acknowledgement method to be instant acknowledgement, sending frame acknowledgement in the down physical period of a next frame.

15. The device of claim 14, wherein when one or multiple users receive the frame acknowledgement as instant acknowledgement in the present time period, the processing module will send the frame acknowledgement to the users in the next time period.

* * * * *